United States Patent
Cho

(10) Patent No.: US 7,412,249 B2
(45) Date of Patent: Aug. 12, 2008

(54) METHOD FOR CHANGING PERFORMANCE CONTROLLING PARAMETER FOR MOBILE TELECOMMUNICATION TERMINAL

(75) Inventor: Song-Rae Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 10/659,400

(22) Filed: Sep. 11, 2003

(65) Prior Publication Data

US 2004/0127239 A1 Jul. 1, 2004

(30) Foreign Application Priority Data

Dec. 31, 2002 (KR) ............... 10-2002-0088315

(51) Int. Cl.
*H04M 1/66* (2006.01)
*H04Q 7/20* (2006.01)

(52) U.S. Cl. .................... 455/466; 455/410

(58) Field of Classification Search ........... 455/456, 455/414, 404, 435, 436, 413, 433, 553, 457, 455/432, 466, 445, 412, 403, 560, 439, 15, 455/552, 558

See application file for complete search history.

(56) References Cited

U.S. PATENT DOCUMENTS

| | | | | |
|---|---|---|---|---|
| 5,046,082 | A | | 9/1991 | Zicker et al. ............ 379/59 |
| 5,915,225 | A | * | 6/1999 | Mills ..................... 455/558 |
| 6,144,653 | A | * | 11/2000 | Persson et al. ........... 370/337 |
| 6,301,484 | B1 | | 10/2001 | Rogers et al. ............ 455/466 |
| 6,577,871 | B1 | * | 6/2003 | Budka et al. ............. 455/453 |
| 6,611,516 | B1 | * | 8/2003 | Pirkola et al. ........... 370/352 |
| 2003/0143977 | A1 | * | 7/2003 | Mittal .................... 455/406 |
| 2004/0203615 | A1 | * | 10/2004 | Qu et al. ................. 455/412.1 |

FOREIGN PATENT DOCUMENTS

| | | |
|---|---|---|
| JP | 1992-271526 | 9/1992 |
| KR | 1998-0007016 | 3/1998 |
| KR | 1999-0047458 | 7/1999 |
| KR | 2000-134669 | 12/2000 |
| KR | 2001-0023992 | 3/2001 |
| KR | 2001-45885 | 6/2001 |
| KR | 2001-0075854 | 8/2001 |
| KR | 2001-95607 | 11/2001 |
| KR | 2002-0015094 | 2/2002 |
| KR | 2002-0032757 | 5/2002 |
| KR | 2002-0050536 | 6/2002 |
| KR | 2002-0056371 | 7/2002 |

OTHER PUBLICATIONS

Office Action issued by the Korean Intellectual Property Office on Dec. 18, 2004.

* cited by examiner

*Primary Examiner*—Naghmeh Mehrpour
(74) *Attorney, Agent, or Firm*—Ked & Associates, LLP

(57) ABSTRACT

Disclosed is a method for changing a performance controlling parameter of a mobile telecommunication terminal, in which the parameter is changed by using an SMS message of the mobile telecommunication terminal. The method preferably includes receiving a short message including a performance controlling parameter to be changed and applying the performance controlling parameter to the mobile telecommunication terminal. When the parameters which control a performance of the mobile telecommunication terminal by a change of the mobile telecommunication system are changed or when the performance controlling parameter of the mobile telecommunication terminal is to be changed by a need of the mobile telecommunication provider/manufacturer, on-line A/S is possible and a cost generated by off-line A/S can be reduced.

19 Claims, 4 Drawing Sheets

FIG. 3A

| FIELD | LENGTH(BITS) |
|---|---|
| SUBPARAMETER_ID | 8 |
| SUBPARARM_LEN | 8 |
| MSG_ENCODING | 5 |
| NUM_FIELDS | 8 |

THE FOLLOWING FIELD IS REPEATED AS NUM_FIELDS

| CHARi | VARIABLE-SEE TSB58-A |
|---|---|

THE SUBPARAMETER ENDS WITH THE FOLLOWING FIELD

| RESERVED | 0-7 |
|---|---|

FIG. 3B

| FIELD | LENGTH(BITS) |
|---|---|
| SUBPARAMETER_ID | 8 |
| SUBPARARMETER_LEN | 8 |

THE FOLLOWING FIELD IS REPEATED AS SUBPARAMETER_LEN

| SUBPARAMETER DATA | 8*SUBPARAMETER_LEN |
|---|---|

FIG. 3C

| SUBPARAMETER | SUBPARAMETER_ID VALUE | TYPE |
|---|---|---|
| A PERFORMANCE CONTROLLING PASSWORD | '00000000' | MANDATORY |
| RESERVED | | |

FIG. 4A

| FIELD | LENGTH(BITS) |
|---|---|
| SUBPARAMETER_ID | 8 |
| SUBPARARMETER_LEN | 8 |

THE FOLLOWING FIELD IS REPEATED AS SUBPARAMETER_LEN

| SUBPARAMETER DATA | 8*SUBPARAMETER_LEN |
|---|---|

FIG. 4B

| SUBPARAMETER | SUBPARAMETER_ID VALUE | TYPE |
|---|---|---|
| A PERFORMANCE CONTROLLING PASSWORD | '00000000' | MANDATORY |
| RESERVED | | |

METHOD FOR CHANGING PERFORMANCE CONTROLLING PARAMETER FOR MOBILE TELECOMMUNICATION TERMINAL

BACKGROUND OF THE INVENTION

1. Field of the Invention

The present invention relates to a mobile telecommunication terminal, and more particularly to a method for changing a performance controlling parameter for a mobile telecommunication terminal using a short message service (SMS).

2. Background of the Related Art

The short message service (SMS) was developed by taking advantage of the digital architecture of modern mobile telecommunication networks. Specifically, digital data can be transmitted throughout the mobile telecommunication network. The SMS allows for transmission of characters, such as numbers, letters, and other symbols, in the form of a short message. Thus, a user can send and receive a short sentence of 80-160 bytes using a mobile communication terminal, without requiring additional equipment.

Usage of SMS has increased dramatically in recent times, as greater numbers of people have begun using mobile communications. Unlike e-mail, an SMS message is transmitted to a recipient almost instantaneously upon its being sent. Hence, SMS has become firmly rooted as a means of telecommunication. Additionally, various information services employ SMS to transmit information such as weather forecasts, news reports, and stock market information. Moreover, the SMS message can include both an origination number and a message.

Usage of SMS has also expanded into the realm of electronic commercial transactions and/or electronic settlements. For example, SMS can be used with credit card companies to transmit transaction approval content to a mobile telecommunication terminal. Among other benefits, such a commercial use can prevent unauthorized credit card transactions.

FIG. 1 illustrates a construction of an SMS system of a general mobile telecommunication network. As shown in FIG. 1, the SMS system includes a mobile telecommunication terminal 1 with software therein that supports the SMS, an SMS message center 4 for routing a short message transmitted through a base station 2 and an exchanger 3, and an SMS server 5 where an application program for various additional services connected to an external network is mounted.

An operation of the SMS system will next be described. First, a short message that has been transmitted by a user through the mobile telecommunication terminal 1 is transmitted to the exchanger 3 through the base station 2. The exchanger 3 certifies that the transmitted message is an SMS message and transmits it to the message center 4. The message center 4 determines to where the message has to be transmitted by using a destination telephone number of the short message and thereby performs a routing.

The SMS provided through the above system is typically transmitted using either a point-to-point service or a broadcasting service.

Point-to-point service is a service for sending a short message to a user of a specified mobile telecommunication terminal to which reliable transmission is possible. That is, the message center checks a state of the destination mobile telecommunication terminal and completes a transmission of the short message according to the determined state.

Broadcasting service is a service for sending a short message to each of a plurality of mobile telecommunication terminals in a group. The group can be established in any manner, such as based on region information or subscription information. In the broadcasting service, since the short message is simultaneously transmitted to the group of users, if a given user turns the power of the mobile telecommunication terminal off or if the user's line is busy, the corresponding short message will not be received.

The related art system and method have various problems, For example, the related art mobile telecommunication terminal has to be upgraded by off-line A/S in order to control special performance features or to change a parameter used to realize the performance.

That is, in order to change the parameter which controls the performance of the mobile telecommunication terminal, the entire software has to be upgraded. Also, when the performance is required to be changed by the mobile telecommunication provider or the mobile telecommunication terminal provider, the user has to visit an agent or a customer service center to receive the off-line A/S.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a system and method for changing a performance controlling parameter of a mobile telecommunication terminal on-line through a SMS.

In one preferred method for changing the performance controlling parameter of a mobile telecommunication terminal, the parameter of the mobile telecommunication terminal is changed by using an SMS message including a parameter relevant to the performance controlling of the mobile telecommunication terminal and a password for a certification with a destination mobile telecommunication terminal.

According to another preferred embodiment, a value for changing the performance controlling parameter is preferably included to a special field among short message formats of the mobile telecommunication terminal.

According to another preferred embodiment, a method for changing a performance controlling parameter of a mobile telecommunication terminal, including receiving a short message service (SMS) message, including a password of a mobile telecommunication terminal and a performance controlling parameter of the mobile telecommunication terminal to be changed, storing the performance controlling parameter in the mobile telecommunication terminal, and applying the performance controlling parameter to the mobile telecommunication terminal.

According to another preferred embodiment, a method for changing a performance controlling parameter of a mobile telecommunication terminal, including receiving a short message service (SMS) message by the mobile telecommunication terminal, wherein a value for changing the performance controlling parameter is included as a special field among SMS message formats of the mobile telecommunication terminal, and including the performance controlling parameter as a parameter of the mobile telecommunication terminal.

According to another preferred embodiment, A short message service (SMS) message including a CHARi field, configured to contain a performance controlling parameter value to be provided to a mobile communication terminal to modify an operation of the mobile telecommunication terminal, and a MSG-ENCODING field, to indicate a kind of code used in the CHARi field.

To achieve at least the above objects in whole or in parts, there is provided a method for changing a performance controlling parameter of a mobile telecommunication terminal including receiving a short message including a password of the mobile telecommunication terminal and a performance controlling parameter to be changed, storing the performance controlling parameter in the mobile telecommunication terminal, and applying the performance controlling parameter to the mobile telecommunication terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 3A, 3B, and 3C illustrate a short message type of a mobile telecommunication terminal according to a first preferred embodiment;

FIGS. 4A and 4B illustrate the short message type of a mobile telecommunication terminal according to a second preferred embodiment.

DETAILED DESCRIPTION OF PREFERRED EMBODIMENTS

Reference will now be made to the preferred embodiments of the present invention, examples of which are illustrated in the accompanying drawings.

The preferred embodiments provide a system and method to change parameters which control a performance of a mobile telecommunication terminal by an SMS message. Thus, when the performance of a mobile telecommunication terminal is required to be changed, for example, due to a change of the mobile telecommunication system or when the performance controlling parameter is required to be changed by the mobile telecommunication provider or the mobile telecommunication terminal manufacturer, a corresponding parameter of the mobile telecommunication terminal is preferably changed on line using an SMS message. At this time, a related art type SMS message is used as much as possible, and only necessary several types are defined newly.

Figure 1:
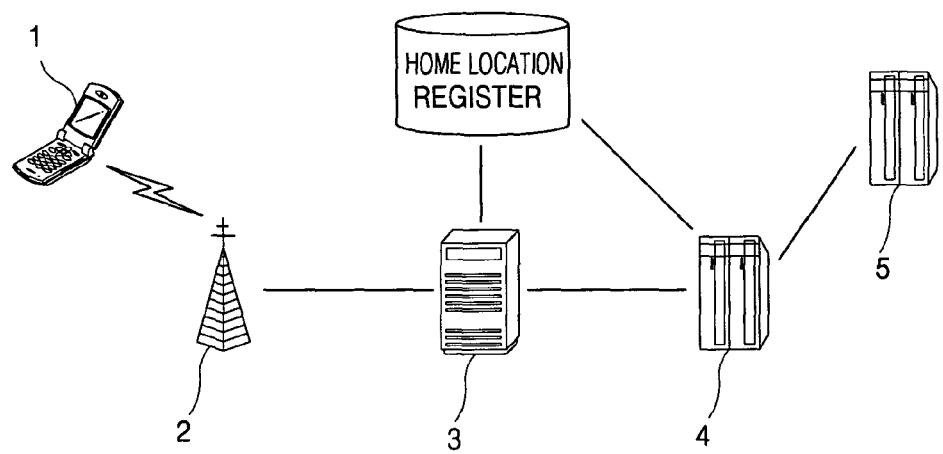
FIG. 1 illustrates a construction of a related art SMS system of a general mobile telecommunication terminal.
Figure 2:
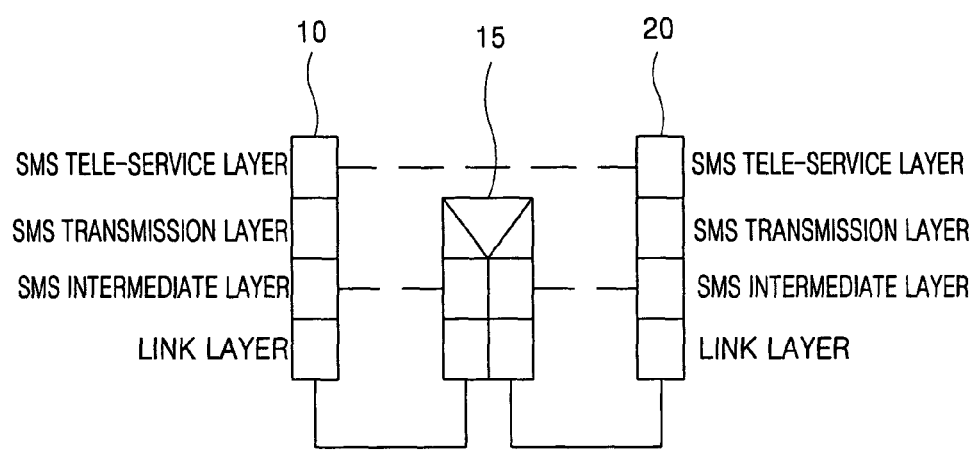
FIG. 2 illustrates a definition of an SMS protocol of the general mobile telecommunication terminal.

FIG. 2 illustrates a definition of an SMS protocol of the general mobile telecommunication terminal. The protocol represents a regulation between the mobile telecommunication terminal and a message center.

As shown in FIG. 2, performances for the SMS are realized at the mobile telecommunication terminal 10 and the message center 20. A base station 15 provides a connection between the mobile telecommunication terminal 10 and the message center 20. By the connecting through the base station, the SMS message can be transmitted to the base station which is providing a current service by being forwarded even in a circumstance such as a hand off.

That is, when a user edits a prescribed message, an SMS tele-service layer transmits values having additional attributes with the message inputted by the user to the SMS transmission layer. The SMS transmission layer adds a destination address and information about whether a response is required or not to the SMS transmission layer, and provides the message to a SMS intermediate layer. A message transmitted from the SMS transmission layer to the SMS intermediate layer is called a transmission layer message. As above, the transmission layer message transmitted to the SMS intermediate layer is transmitted to the base station 15 through a link layer.

FIGS. 3A, 3B, and 3C illustrate a first preferred embodiment of an SMS message type of a mobile telecommunication terminal, which re-defines necessary parts so that the SMS message can be used to change a performance controlling parameter in a sub-parameter of the transmission layer message.

In this example, a wireless messaging tele-service corresponding to a related art tele-service and an SMS point-to-point service among transmission layer message types are used in the short message according to this preferred embodiment. It should be understood that other alternatives could be used.

FIG. 3A illustrates a user data format represented in TIA/EIA-637-A section 4.5.2, which is incorporated herein by reference.

SUBPARAMETER_ID is a sub-parameter identifier and this field is preferably set as '00000001'. SUBPARAM_LEN is a length of the sub-parameter, which is expressed as 8 bits, except the SUBPARAMETER_ID and the SUBPARAM_LEN. MSG_ENCODING denotes a kind of a message encoding. For example, '00000' indicates an octet and '10000' indicates Korean. NUM_FIELDS denotes a length of CHARi field, and the CHARi includes letters corresponding to a message.

In the user data format, if the MSG_ENCODING field is the octet ('00000') and the first octet of the CHARi is a special letter byte (e.g. 0×00), which preferably indicates a parameter change, contents corresponding to the parameter change of the mobile telecommunication terminal are included as formats of FIG. 3B from the second octet of the CHARi. However, except for cases relative to the parameter change of the mobile telecommunication terminal, a TIA/EIA-637-A definition is applied.

The SUBPARAMETER_ID of FIG. 3B preferably has a parameter ID like that of FIG. 3C with respect to the parameter change of the mobile telecommunication terminal.

A password is preferably provided to prevent anyone except an authorized person from gaining access to the parameter change of the mobile telecommunication terminal. Accordingly, when the mobile telecommunication terminal receives a short message relevant to the parameter change of the mobile telecommunication terminal, a certification process is preferably performed using the password.

FIGS. 4A and 4B illustrates a second preferred embodiment of the short message type of a mobile telecommunication terminal. According to this embodiment, the short message defines not only a tele-service, which is defined at the TIA/EIA-637-A section 3.4.3.1-1, but also a new tele-service relevant to the performance controlling parameter change. Also, the short message preferably adds sub-parameters of FIG. 4 to barrier data shown in the TIA/EIA-637-A section 3.4.3.7 in order to transmit the performance controlling parameter.

The SUBPARAMETER_ID of FIG. 4A preferably requires a password to access to the parameter change of the mobile telecommunication terminal like FIG. 4B with respect to the parameter change of the mobile telecommunication terminal.

Figure 5:
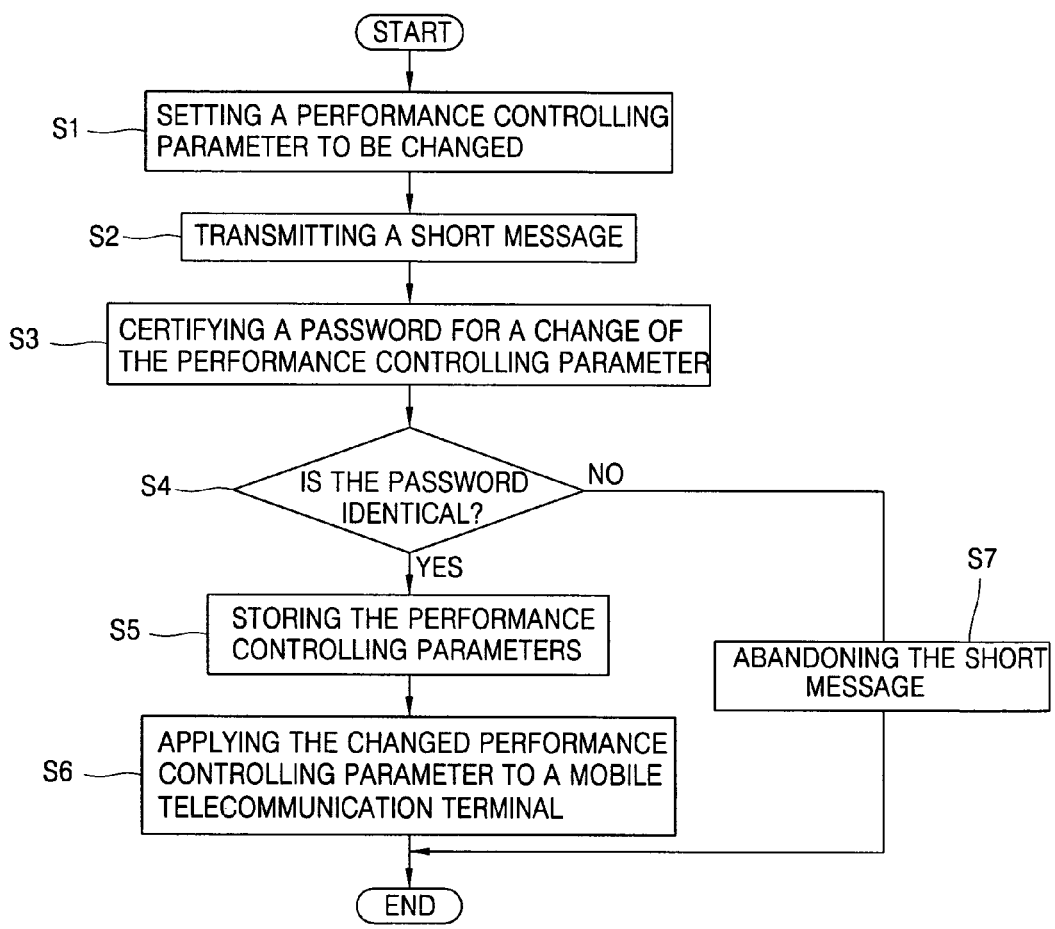
FIG. 5 is a flow chart illustrating a method for changing a performance controlling parameter of a mobile telecommunication terminal according to the preferred embodiments.

FIG. 5 is a flow chart illustrating a method for changing a performance controlling parameter of a mobile telecommunication terminal according to a preferred embodiment.

First, a parameter to be changed is inputted to the short message format of the mobile telecommunication terminal, thereby setting the change parameter (step S1). Additionally, a password for certifying the corresponding mobile telecommunication terminal at the time of the parameter change may also be provided at this time. The password not only limits access to a prescribed user to perform to the parameter change, but also determines whether the mobile telecommunication terminal that transmitted the short message is a mobile telecommunication terminal of which a parameter has to be changed. That is, since each mobile telecommunication terminal is provided with its own password, when the performance controlling parameter of the special mobile telecommunication terminal is changed, a password corresponding to the mobile telecommunication terminal is preferably transmitted with the short message.

The SMS point-to-point message, including the changed parameters, is then transmitted to a prescribed mobile telecommunication terminal (step S2). Then, the corresponding object mobile telecommunication terminal extracts the password inputted to the performance controlling password field of the received SMS message and certifies the password (step S3).

Next, it is determined whether the password is correct (step S4). If the password inputted to the performance controlling password field is identical to that set in the receiving mobile telecommunication terminal, the SMS message including the performance controlling parameter is received by the object mobile telecommunication terminal. The performance controlling parameters transmitted through the SMS message are then stored in a corresponding memory address of the mobile telecommunication terminal (step S5).

A new parameter stored in the memory is then applied to the current mobile telecommunication terminal as is, or is applied after the mobile telecommunication terminal is rebooted (step S6).

If, however, the password is not identical to that of the mobile telecommunication terminal, it is determined that the mobile telecommunication terminal should not receive the short message. The short message is thereby abandoned (step S7).

The system and method for providing a performance controlling parameter as described herein has many advantages. For example, as a method for changing the performance controlling parameter of the mobile telecommunication terminal, both the SMS point-to-point service and the broadcasting service which controls a performance at a time by using a broadcasting message for the mobile telecommunication terminal having the same parameter change software therein are possible.

Also, when a recall is required after determining that a mobile telecommunication terminal has a problem in the performance controlling part, an entity such as the mobile telecommunication terminal manufacturing company can change the performance controlling parameter through the short message. The performance controlling error of the mobile telecommunication terminal can thus be easily removed without requiring off line service.

Accordingly, in the method for changing the performance controlling parameter of the mobile telecommunication terminal according to the preferred embodiment, the parameters relevant to controlling the performance of the mobile telecommunication terminal can be changed through the short message, thereby enabling on-line A/S and reducing a cost generated by off-line A/S.

Moreover, in the method for changing the performance controlling parameter of the mobile telecommunication terminal according to the preferred embodiment, the parameters relevant to controlling the performance of the mobile telecommunication terminal can be upgraded even when the user cannot recognize the need, or even without the user taking action, thereby improving the user's convenience and reducing a management cost for the mobile telecommunication terminal, for example by the manufacturing company.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of performance upgrading for a receiving terminal, comprising:
   generating information related to at least one parameter for the performance upgrading within the receiving terminal, wherein the information is included in a short message service (SMS) message of a messaging service for the receiving terminal;
   transmitting the SMS message, including the information, using the messaging service to the receiving terminal; and
   upgrading performance of the receiving terminal by changing at least one parameter stored within the receiving terminal based on the SMS message transmitted to the receiving terminal, wherein the information within the SMS message includes a value used for certifying the performance upgrading within the receiving terminal, and the at least one parameter is changed when the value included in the information is identical to a previously stored value within the receiving terminal or a value inputted by a user of the receiving terminal.

2. The method of claim 1, wherein the value comprises a password.

3. The method of claim 1, wherein the value is at least one of a password, key value, and a security code.

4. The method of claim 1, wherein the value is pre-set in each terminal.

5. The method of claim 1, wherein the SMS message of the messaging service is discarded when the value included in the information is not identical to the previously stored value within the receiving terminal or the value inputted by the user.

6. The method of claim 1, wherein the at least one parameter is used for a software upgrading within the receiving terminal.

7. The method of claim 1, wherein the value is used for certifying a sender of the message.

8. The method of claim 1, wherein the information is included in a certain field of the SMS message.

9. A method of performance upgrading for a receiving terminal, comprising:
   receiving a message of a messaging service via a network, wherein the message of the messaging service includes information related to at least one parameter for the performance upgrading of the receiving terminal;
   comparing a password within the received message with a previously stored value in a memory of the receiving terminal;
   storing the received message and changing the at least one parameter within the receiving terminal based on the received information within the message; and
   upgrading a performance of the receiving terminal based on the changed at least one parameter stored within the receiving terminal, wherein the upgrading is performed only when the password within the received message is identical to the previously stored value in the memory.

10. The method of claim 9, further comprising: by a sending terminal before receiving the message:
   forming the message by inputting a performance controlling parameter to be changed into a performance controlling parameter field of the message and by inputting a key value corresponding to the receiving terminal to a performance controlling key value field of the message; and
   transmitting the formed message to the receiving terminal.

11. The method of claim 9, wherein the information includes the password for certifying the performance upgrading within the receiving terminal.

12. The method of claim 9, wherein the received message is discarded when the password included in the information is not identical to the previously stored value within the receiving terminal.

13. The method of claim 11, wherein the information is included in a certain field of the message.

14. The method of claim 13, wherein the certain field comprises:
   a first sub-field to contain a performance controlling parameter to be changed; and
   a second sub-field to denote a kind of codes inputted to the first sub-field.

15. The method of claim 14, wherein a sub-parameter of the first sub-field comprises:
   a performance controlling key value field where the password is inputted; and
   a performance controlling parameter field where the performance controlling parameter value to be changed is inputted.

16. The method of claim 14, wherein the first sub-field is inputted by an octet unit.

17. The method of claim 14, wherein a prescribed byte that notifies a change of the performance controlling parameter is inputted in a first octet of the first sub-field and a change value for the performance controlling parameter is inputted to a second octet.

18. A mobile communication apparatus, comprising:
   a transceiver to transmit and receive data;
   a memory to store the data from the transceiver or from an external source; and
   a processor cooperating with the transceiver and the memory to perform:
      receiving a message of a messaging service via a network, wherein the message of the messaging service includes information related to at least one parameter for the performance upgrading within a receiving terminal,
      comparing a password within the received message with a value input by a user of the receiving terminal,
      storing the received message and changing the at least one parameter within the receiving terminal based on the received information within the message; and
   upgrading a performance of the receiving terminal based on the changed at least one parameter stored within the receiving terminal, wherein the upgrading is performed only when the password is identical to the value input by the user of the receiving terminal.

19. A method for changing a performance controlling parameter of a mobile telecommunication terminal, comprising:
   receiving a message from a network, wherein the message includes a key value of a mobile telecommunication terminal and a new performance controlling parameter of the mobile telecommunication terminal to be changed, wherein the key value is used to certify a sender of the message;
   storing the key value and the new performance controlling parameter in a memory of the mobile telecommunication terminal;
   replacing a previously stored performance controlling parameter of the mobile telecommunication terminal with the new performance controlling parameter of the mobile telecommunication terminal only when the stored key value corresponds to a previously input password; and
   controlling a performance of the mobile telecommunication terminal based on the new performance controlling parameter stored in the memory.

* * * * *